United States Patent [19]  [11]  4,287,260
Prall  [45]  Sep. 1, 1981

[54] CORDIERITE CRYSTAL-CONTAINING GLAZE

[75] Inventor: Paul D. Prall, Lancaster, Ohio

[73] Assignee: Anchor Hocking Corporation, Lancaster, Ohio

[21] Appl. No.: 172,514

[22] Filed: Jul. 28, 1980

Related U.S. Application Data

[63] Continuation-in-part of Ser. No. 90,469, Nov. 1, 1979, abandoned.

[51] Int. Cl.³ .......................... B32B 17/06; C03C 5/00
[52] U.S. Cl. .................................... 428/410; 106/45; 106/48; 106/54; 428/428
[58] Field of Search ....................... 106/48, 39.7, 39.6, 106/52, 54, 45; 428/428, 212, 410

[56] References Cited

U.S. PATENT DOCUMENTS

| | | | |
|---|---|---|---|
| 3,380,838 | 4/1968 | Sack | 106/48 X |
| 3,384,508 | 5/1968 | Bopp et al. | 106/54 X |
| 3,499,787 | 3/1970 | Inoue | 106/39.7 X |
| 3,532,524 | 10/1970 | Petticrew | 106/48 |
| 3,713,877 | 1/1973 | Kirchner et al. | 428/410 X |
| 3,840,394 | 10/1974 | Eppler | 106/48 X |
| 3,846,098 | 11/1974 | Nakashima et al. | 106/45 |
| 4,015,048 | 3/1977 | Martin | 428/428 |

*Primary Examiner*—Helen M. McCarthy

*Attorney, Agent, or Firm*—Wood, Herron & Evans

[57] ABSTRACT

A cordierite crystal-containing glaze for fine ceramics such as cordierite ceramics. The glaze has an oxide composition comprising,

| | |
|---|---|
| $SiO_2$ | 66–75 wt. % |
| $Al_2O_3$ | 13–22 |
| $MgO$ | 3–8 |
| $B_2O_3$ | 2.5–7 |
| $Na_2O + K_2O$ | .4–2.0 |

The above components should comprise at least 95%, and preferably 96–99%, of the total. The glaze can also include 0–2% ZnO and 0 ∝ 2% $ZrO_2$. Apart from colorants, the balance, if any, may comprise small amounts of other compatible compounds such as CaO, SrO, BaO, $Cs_2O$ and $F_2$, up to a total of 3%; but the ratio of $SiO_2+Al_2O_3+MgO$ to the sum of such other compatible compounds should be at least about 28:1. $Fe_2O_3$ and $TiO_2$, which are generally present as impurities in standard batch raw materials, are not harmful in amounts less than a total of 1.5%; in greater amounts, they begin to alter the color of the glaze. $Li_2O$ should not be present in any amount greater than about 0.5%. The glaze has good gloss and durability and is transparent in the absence of added pigmentation or refractory particles.

19 Claims, No Drawings

CORDIERITE CRYSTAL-CONTAINING GLAZE

RELATED APPLICATION

This application is a continuation-in-part of copending application Ser. No. 90,469, filed Nov. 1, 1979, now abandoned.

FIELD OF THE INVENTION

This invention relates to a cordierite crystal-containing glaze which is particularly suitable for use on cordierite-type ceramics.

BACKGROUND

In the copending application of Dennis R. VerDow, Ser. No. 90,470, titled "High Strength Cordierite Ceramic," filed Nov. 1, 1979, there is disclosed a cordierite-type ceramic which has a wide firing tolerance, unusually high strength, and which among other uses is especially suitable for use in freezer-to-oven utensils and dinnerware.

This application relates to a glaze which is particularly adapted for use on cordierite ceramics of the type there disclosed, although it can also be used on other fine ceramics.

Cordierite, 2 MgO.2Al$_2$O$_3$.5SiO$_2$, corresponds to the oxide composition 51.3% SiO$_2$, 34.9% Al$_2$O$_3$, and 13.8% MgO. Cordierite ceramics (i.e., ceramics having a substantial content of cordierite crystals) possess a low coefficient of thermal expansion, in the range of approximately 14–40×10$^{-7}$/°C. Notwithstanding the advantageously low expansion, however, cordierite ceramics have found only limited use in ceramic whiteware for cooking and dining use. One reason for this has been the limited glazability of such ceramics.

Whiteware is usually glazed in practice, in order to provide a protective surface coating which is hard, resistant to attack in its intended use, and impermeable. Typical glazing practice requires that the glaze be of lower expansion than the ceramic body onto which it is applied, so that the glaze will be in compression rather than tension. Being of low expansion themselves, cordierite ceramics require glazes of very low expansion, and this constitutes a rather severe constraint in practice; relatively few glasses are known which have expansions lower than cordierite ceramics. Moreover, the problem is further complicated by the fact that many glasses which might be useful require melting at temperatures above the practical firing limits or cordierite ceramics.

Self-glazing techniques are known for cordierite bodies, wherein a glaze "skin" self-forms on the body during firing of the body itself, without application of a separate glaze. However, it is difficult to control the physical properties of self-glazed cordierites, and insofar as I am aware the technique has not developed commercially.

Glazes have heretofore been disclosed for use on cordierite-based low expansion ceramics, but they have had undesirably low surface gloss and durability, and they have been translucent or opaque rather than transparent. Eppler U.S. Pat. No. 3,840,394 discloses a glaze for use on cordierite ceramics, wherein the glaze contains crystals of barium oxide compounds such as celsian. Eppler's glazes comprise 6–65 wt.% BaO, 0–12% MgO, 0–15% Na$_2$O, 9–35% Al$_2$O$_3$, 18–65% SiO$_2$, and 5–30% flux. These glazes depend on a relatively high content of BaO in relation to the other crystal forming components: the ratio of the total of SiO$_2$+Al$_2$O$_3$+MgO, to BaO is less than 15:1. As fired, the Eppler glaze has a matte to moderate gloss characteristic. The Eppler glazes are described as being translucent or opaque.

The Li$_2$O-containing glazes, wherein the lithia content leads to the formation of low expansion lithia-alumino silicate crystals such as Beta-eucryptite and Beta-spodumene, have previously been suggested for use on cordierite ceramics. Those glazes are highly crystalline, and the index of refraction of the Li$_2$O-containing crystals differs substantially from that of the glassy matrix around them. As a result of this difference in refraction, such glazes are opaque and they lack the brilliance or clarity which in many cases is so desirable to provide the appearance of fine china. Other opaque glazes have been suggested for cordierite bodies, but they have had undesirable characteristics including application difficulties, limited firing ranges, variable gloss and limited decorating possibilities.

BRIEF DESCRIPTION OF THE INVENTION

The glaze of this invention differs from previously known glazes for cordierite bodies in that, as fired, it is characterized by a substantial or predominant content of cordierite crystals. Further, this crystal content has an index of refraction which is close to that of the glassy matrix, in which the crystals reside, and hence these crystals cause little refraction. As a result, this glaze provides the brilliance, depth, or clarity, which in the past have been lacking in glazed cordierite ceramics. If desired, this transparency can be masked by adding other crystal-forming ingredients, or by adding insoluble pigments, so that the glaze can thus be made either transparent or opaque, clear or colored, glossy or matte, as desired.

The glaze has a melting temperature which is sufficiently low that it can be used at glaze firing temperatures as low as 1200° C., or even lower. Its very low coefficient of expansion "fits" well with that of cordierite.

These properties are provided by glazes within the following approximate compositional ranges:

| Range | % By Weight |
|---|---|
| SiO$_2$ | 66–75 |
| Al$_2$O$_3$ | 13–22 |
| MgO | 3–8 |
| B$_2$O$_3$ | 2.5–7 |
| Na$_2$O + K$_2$O | .4–2.0 |

The above components should comprise at least 95%, and preferably 96–99%, of the total. The glaze can also include 0–2% ZnO and 0–2% ZrO$_2$. (Zinc oxide is desirable, when there is no zinc oxide in the underlying ceramic to which the glaze is to be applied). Apart from colorants, the balance, if any, may comprise small amounts of other compatible compounds, including CaO, SrO, BaO, Cs$_2$O and F$_2$, up to a total of 3%. The ratio of the sum of the percentages SiO$_2$+Al$_2$O$_3$+MgO to the sum of the percentages of all such other compatible compounds, if present, should exceed about 28:1. This tends to suppress the formation of other crystalline phases other than cordierite. Li$_2$O should not be present in more than about 0.5%. In addition, Fe$_2$O$_3$ and TiO$_2$, which are generally present as impurities in standard batch raw materials, are not harmful in amounts less than a total of 1.5%. Colorants may be added for specific effects. Larger amounts of $Fe_2O_3$ and $TiO_2$ may be added for their colorant effect.

It is usually desirable that a portion of the glaze be formed first as a frit, by quenching a glass melt, and then mixing the frit with a suspending agent, e.g., 4-16% clay, and/or with a refractory material (e.g., up to 8% alumina or flint) to modify the surface texture, and/or with an organic binder (2% or less is usually sufficient) to improve adherence onto the article to be glazed. In this event the composition of the frit is calculated to provide a final oxide composition within the ranges set forth above.

PREFERRED PRACTICE OF THE INVENTION

Work to date has shown that the following procedure gives good results as a two-fire procedure, and it is presently preferred. As indicated above, it has been found preferable first to melt and quench a glass to form a frit, then to add a suspending agent such as clay to the frit and grind the resulting mixture to form the actual glaze to be applied.

In the most preferred practice, a batch of the following composition is mixed:

| | |
|---|---|
| steatite talc | 20.6 % by wt. |
| anhydrous borax | 2.1 |
| boric acid | 3.5 |
| aluminum hydroxide | 20.3 |
| zinc zirconium silicate | .5 |
| zinc oxide | .9 |
| calcium carbonate | .2 |
| potassium carbonate | .8 |
| flint (silica) | 51.1 |
| | 100.0 |

Since the oxide composition of the batch will depend on the exact source and composition of the various batch components, the compositions of the batch ingredients are set forth below for reference.

TABLE I

| | Composition of Batch Components | | | | | | | | | | |
|---|---|---|---|---|---|---|---|---|---|---|---|
| | $SiO_2$ | $Al_2O_3$ | MgO | $B_2O_3$ | $Na_2O$ | $K_2O$ | ZnO | CaO | $ZrO_2$ | $Fe_2O_3$ | $TiO_2$ |
| Steatite talc | 61.3 | .9 | 30.3 | | .07 | .01 | | .09 | | .9 | .05 |
| Anhydrous borax | | | | 69.3 | 30.7 | | | | | | |
| Boric acid | | | | 56.5 | | | | | | | |
| Aluminum hydroxide | .01 | 65.0 | | | .15 | | | | | .003 | |
| Zinc zirconium silicate | 24.2 | | | | | | 28.6 | | 46.4 | | |
| Zinc oxide | | | | | | | 99.3 | | | | |
| Calcium carbonate | | | | | | | | 56.0 | | | |
| Potassium carbonate | | | | | | 62.2 | | | | | |
| Flint (silica) | 99.7 | .13 | | | | | | | | .02 | |
| Bentonite | 64.32 | 20.7 | 2.3 | 2.6 | .4 | | | .5 | | 3.5 | .14 |

The frit batch is melted, for example for 4 hours at about 1550° C. After melting, the molten glass is quenched in water to improve grinding, and then is dried. The frit can be ground in accordance with conventional practice, for example in a porcelain ball mill containing flint pebbles and water, to approximately minus 200 mesh size.

Based on compositions of raw materials as set forth in Table I, the oxide composition of the preferred form of frit is:

| Frit Ex. 1 | |
|---|---|
| $SiO_2$ | 71.1 wt. % |
| $Al_2O_3$ | 15.0 |
| MgO | 7.0 |
| $B_2O_3$ | 3.8 |
| $Na_2O$ | .7 |
| $K_2O$ | .2 |
| ZnO | 1.2 |
| $ZrO_2$ | .3 |
| CaO | .5 |
| $Fe_2O_3$ | .2 |
| | 100.0 |

The frit will also usually contain a trace, generally less than 0.1% of titania.

As already indicated, it is desirable to mix the frit with a suspending agent to form a slip. Conventional organic suspending agents can be used for this purpose, but it is preferred to use a compatible inorganic material such as bentonite or kaolin clay. This helps keep the glaze in suspension to improve application. If it is desired to modify and usual glossy, smooth surface so as to provide a matte or textured surface, or to increase opacity, or reduce costs, an unmelted component such as alumina or flint ($SiO_2$) may also or alternatively be added. It is also usually desirable to incorporate a binder, to adhere the glaze to the ware before firing. A conventional organic binder such as xanthum gum is suitable for this purpose.

In the preferred practice the frit is mixed with bentonite in proportions of about 96% frit and 4% bentonite, with an additional 0.75% of xanthum gum binder ("Kelzan"). Water is added, for example in the amount of approximately 1.5 times the total batch weight, and the glaze slip is milled for about an hour. After milling the slip is adjusted to a viscosity of approximately 200-300 centipoise, and is then ready for application. The addition of the bentonite changes the oxide composition; with the inclusion of the bentonite the glaze itself corresponds to the calculated oxide composition:

| Glaze Ex. A | |
|---|---|
| $SiO_2$ | 71.0 wt. % |

-continued

| Glaze Ex. A | |
|---|---|
| Al$_2$O$_3$ | 15.3 |
| MgO | 6.8 |
| B$_2$O$_3$ | 3.7 |
| Na$_2$O | .8 |
| K$_2$O | .2 |
| ZnO | 1.1 |
| ZrO$_2$ | .3 |
| CaO | .5 |
| Fe$_2$O$_3$ | .3 |
| | 100.0 |

The trace of titania is carried over into the glaze. (It should be recognized that once the frit has been fired on a ceramic body, its composition as analyzed will differ slightly from the "calculated" or "as batched" composition given above. In particular, alkali and ZnO tend to migrate between the underlying body and the frit, and thus to appear in slightly different proportions in an analysis. It should also be noted that the as-analyzed composition of the fired glaze will differ, depending on the "depth" at which the analysis is made. As pointed out hereinafter, the exterior surface of the glaze is richer in SiO$_2$ than the interior of the glaze.)

GLAZE APPLICATION

The best results from the preferred glaze (Ex. A) are obtained in a two-fire process, the glaze being applied to the ceramic after the ceramic has been bisque fired, but before the body has been fully matured. By way of identification of the preferred cordierite type of underlying ceramic body onto which the glaze can be applied, that body preferably comprises, 33–46% SiO$_2$; 37–57 Al$_2$O$_3$; 5.5–15% MgO; 0.4–1.7% ZnO, 1.0–3.0% (Na$_2$O+K$_2$O); and 0–5% ZrO$_2$. These oxides should be at least 97% of the total. No Li$_2$O should be present. For use with the preferred glaze of Ex. A hereof, most preferably the composition of the body should be:

| | | |
|---|---|---|
| SiO$_2$ | 39–40 | wt. % |
| Al$_2$O$_3$ | 45–46 | |
| MgO | 11–12 | |
| ZnO | .7–1.0 | |
| Na$_2$O | 1.0–1.4 | |
| K$_2$O | .4–.6 | |
| CaO | .2–.4 | |
| Fe$_2$O$_3$ | 0–.5 | |
| TiO$_2$ | 0–.5 | |

Cordierite bodies of the composition given above form the subject of the previously identified VerDow application Ser. No. 90,470, the disclosure of which is incorporated by reference. It should be noted however that the glaze is useful for application onto other types of ceramics, provided the expansions fit.

The body can be bisque fired, for example by heating at about 2° C./min. to 1150° C.; 1 hour hold; and cooling at about 6° C./min.

The glaze can be applied by spray gun, to ware preheated to about 93° C. in order to prevent "crawling" of the glaze, the ware surface should not be wet to the point where the glaze is fluid, and best results are achieved when the initial coating is applied "dry". After a light coating is applied, the surface can be allowed to become slightly wet or dark. This normally produces a relatively durable coating which can be handled. Application thickness may for example be between 20 and 30 mils. The ware is glost-fired, i.e., second fired, for example by heating at about 2° C./min. to 1000° C.; holding 15 minutes; heating at 1° C./min. to 1330°; 2½ hour soak at 1330° C.; followed by natural cooling.

The resulting glaze has a glossy, transparent appearance, without crazing, and a thermal shock resistance of 290° C. as determined by an extension of ASTM C554-77, "Standard Test Method for Crazing Resistance of Fired Glazed Ceramic Whiteware by a Thermal Shock Method." Failure was determined when the body cracked or the glaze crazed.

This preferred glaze appears to be optimal for the particular ceramic body composition set forth. Under these circumstances, the glaze substantially improves the strength of the product; that is, application of the glaze can improve the MOR of the article by as much as 3,000 psi or more, in both single fire and double fire comparisons.

X-ray diffraction analysis of the glaze established the presence of cordierite crystals as the major crystalline phase in the glaze. Other crystalline phases which may be present in minor amounts include corundum and spinel.

Investigation has established that the crystal growth within the glaze itself apparently proceeds from the interface with the underlying crystalline body, toward the surface of the glaze. That is, as viewed in cross section, the crystal content increases in the direction toward the underlying body. As the crystals form within the glaze, they separate from the remaining glassy content and the composition of the glassy content therefore gradually changes. The outer surface of the glaze has minimal crystal content and is highly glassy, containing a very high silica content. This apparently imparts the very high observed chemical durability.

There is apparently a synergistic relation between the glaze and the underlying crystalline body. If a sample of the glaze composition is fired as a bar (i.e., not on an underlying ceramic) at the normal firing conditions, crystals will form, but they are primarily cristobalite, not cordierite. That is to say, the application of the glaze onto an underlying ceramic body such as cordierite leads to the formation of a product with quite different properties than those of the glaze fired alone, or in a platinum crucible. It is the presence of the cordierite crystals, formed when the glaze is applied over a crystalline body, that imparts the desirable properties to the glaze.

One desirable aspect of the preferred composition is that it has been tested and found effective for use in producing a wide range of colors. This can be done by adding conventional colorants, e.g., tin oxide, nickel oxide, etc., in amounts up to about 10% to the 100% dry batch.

The following tables illustrate formation of other glazes in accordance with the invention, Table II illustrating the composition of the frits as intially formed, Table III the mixing of the frit with various additives, Table IV the compositions of the resulting glazes, and Table V properties of the glazes as fired on the ceramic.

TABLE II

Frit Compositions

| Frit Ex. No. | SiO$_2$ | Al$_2$O$_3$ | MgO | B$_2$O$_3$ | Na$_2$O | K$_2$O | ZnO | CaO | ZrO$_2$ | Fe$_2$O$_3$ |
| --- | --- | --- | --- | --- | --- | --- | --- | --- | --- | --- |
| 2 | 75.1 | 14.5 | 3.7 | 3.8 | .7 | .2 | 1.2 | .5 | .3 | .2 |
| 3 | 72.8 | 14.5 | 6.1 | 3.8 | .7 | .2 | 1.2 | .5 | .3 | .2 |
| 4 | 70.8 | 14.9 | 6.9 | 3.8 | .7 | .7 | 1.2 | .5 | .3 | .2 |
| 5 | 70.8 | 14.9 | 6.9 | 3.8 | 1.2 | .2 | 1.2 | .5 | .3 | .2 |
| 6 | 69.0 | 15.5 | 7.1 | 3.6 | 1.2 | .3 | 1.6 | .6 | .9 | .2 |
| 7 | 72.0 | 15.2 | 7.1 | 3.9 | .8 | .2 | — | .5 | .3 | .2 |
| 8 | 70.4 | 14.9 | 6.9 | 4.8 | .7 | .2 | 1.1 | .5 | .3 | .2 |
| 9 | 71.3 | 15.1 | 7.0 | 3.8 | .7 | .2 | 1.1 | .5 | — | .2 |
| 10 | 70.0 | 20.0 | 3.7 | 3.8 | .7 | .2 | 1.2 | .5 | .3 | .2 |
| 11 | 71.6 | 15.1 | 7.0 | 3.7 | .7 | .2 | 1.1 | .02 | .3 | .2 |

TABLE III

Addition, to Frit

| Glaze No. | Frit Ex. No. | wt. % of Frit | Added Material | Added Material wt. % |
| --- | --- | --- | --- | --- |
| B | 2 | 96 | bentonite | 4 |
| C | 3 | 96 | bentonite | 4 |
| D | 4 | 96 | bentonite | 4 |
| E | 5 | 96 | bentonite | 4 |
| F | 6 | 92.9 | kaolin | 3.1 |
|   |   |      | bentonite | 4.0 |
| G | 6 | 94 | flint | 2 |
|   |   |    | bentonite | 4 |
| H | 7 | 96 | bentonite | 4 |
| I | 8 | 96 | bentonite | 4 |
| J | 9 | 92 | alumina | 4 |
|   |   |    | bentonite | 4 |
| K | 10 | 96 | bentonite | 4 |
| L | 11 | 96 | bentonite | 4 |

TABLE IV

Glaze Compositions

| Glaze Ex. | SiO$_2$ | Al$_2$O$_3$ | MgO | B$_2$O$_3$ | Na$_2$O | K$_2$O | ZnO | CaO | ZrO$_2$ | Fe$_2$O$_3$ |
| --- | --- | --- | --- | --- | --- | --- | --- | --- | --- | --- |
| B | 74.7 | 14.7 | 3.7 | 3.7 | .8 | .2 | 1.1 | .5 | .3 | .3 |
| C | 72.5 | 14.7 | 5.9 | 3.7 | .8 | .2 | 1.1 | .5 | .3 | .3 |
| D | 70.7 | 15.2 | 6.8 | 3.6 | .8 | .7 | 1.1 | .5 | .3 | .3 |
| E | 70.7 | 15.2 | 6.8 | 3.6 | 1.3 | .2 | 1.1 | .5 | .3 | .3 |
| F | 68.5 | 16.5 | 6.7 | 3.4 | 1.3 | .3 | 1.5 | .6 | .9 | .4 |
| G | 67.7 | 17.8 | 6.5 | 3.3 | 1.3 | .3 | 1.5 | .6 | .9 | .3 |
| H | 71.8 | 15.4 | 6.9 | 3.7 | .9 | .2 | — | .5 | .3 | .3 |
| I | 70.3 | 15.1 | 6.7 | 4.6 | .8 | .2 | 1.1 | .5 | .3 | .3 |
| J | 68.3 | 18.7 | 6.5 | 3.5 | .8 | .2 | 1.1 | .5 | — | .3 |
| K | 69.8 | 20.0 | 3.6 | 3.6 | .8 | .2 | 1.2 | .5 | .3 | .2 |
| L | 71.4 | 18.8 | 6.6 | 3.4 | .8 | .2 | 1.1 | .04 | .3 | .3 |

TABLE V

Glaze Properties

| Glaze Ex. | Thermal shock, difference, °C. | Frit thermal expansion, × 10$^{-7}$/°C. (25-300° C.) | Modulus of Rupture, psi | Appearance |
| --- | --- | --- | --- | --- |
| B |   |   | 13,000 | glossy |
| C |   |   | 17,000 | glossy |
| D |   |   | 18,000 | glossy |
| E |   |   | 16,000 | glossy |
| F | 275 |   |   | glossy |
| G | 230 |   |   | glossy |
| H | 335 | 28.75 | 19,000 | very glossy |
| I | 365 | 27.50 | 16,000 | very glossy |
| J | 305 | 29.50 | 18,000 | glossy to semi-matte |
| K |   |   | 14,000 | glossy |
| L | 305 | 27.75 | 16,000 | glossy |

These glazes ordinarily display good to high gloss, as shown in Table V, and are ordinarily transparent. This is apparently the result of a "match" between the indices of refraction of the cordierite crystals in the glaze and the residual glassy matrix. Where a low gloss, translucent or opaque characteristic is desired, a material such as alumina can be mixed with the frit; being refractory, the alumina particles do not melt in firing and they reduce the gloss and clarity of the glaze. Thus glaze J, compounded by addition of 4% alumina to the frit, has a glossy to semi-matte appearance after firing. However, if the glaze is made increasingly matte, it generally loses chemical durability, and eventually it becomes unsuitable for commercial use.

It has tentatively been concluded that the tendency for crystal formation in these glazes varies with the amounts of minor oxide components which act as devitrification inhibitors. For example, decreasing the amount of B$_2$O$_3$, ZnO and CaO tends to increase the amount of crystal formation; while increasing the amount of B$_2$O$_3$ or adding Cs$_2$O and Li$_2$O tends to reduce the amount of crystal formation.

The foregoing description explains and illustrates the invention in several specific embodiments. From what has been said, those skilled in the art will understand that the invention can be used in other embodiments within the scope of the following claims.

What is claimed is:

1. A low expansion ceramic body having fired thereon a fused glaze which has an oxide composition consisting essentially of

| | |
| --- | --- |
| SiO$_2$ | 66–75 wt. % |
| Al$_2$O$_3$ | 13–22 |
| MgO | 3–8 |
| B$_2$O$_3$ | 2.5–7 |
| Na$_2$O + K$_2$O | .4–2.0 | the above listed components totaling at least 95% of the composition, and Li$_2$O is not more than 0.5%, the total of $Fe_2O_3$ and $TiO_2$ is not more than 1.5%, and at least one of ZnO and $ZnO_2$ is included in an amount less than 2%, said glaze having a ratio $(SiO_2+Al_2O_3+MgO)/(CaO+SrO+BaO+Cs_2O+F_2)$ which is at least about 28:1, said glaze containing cordierite crystals as the major crystalline phase therein and the exterior of the glaze is richer in $SiO_2$ than the interior of the glaze.

2. The article of claim 1 wherein said glaze has the composition,

|  |  |
|---|---|
| $SiO_2$ | 71.0 wt. % |
| $Al_2O_3$ | 15.3 |
| MgO | 6.8 |
| $B_2O_3$ | 3.7 |
| $Na_2O$ | .8 |
| $K_2O$ | .2 |
| ZnO | 1.1 |
| $ZrO_2$ | .3 | the balance being CaO, $Fe_2O_3$ and $TiO_2$.

3. The article of claim 1 or 2 wherein said body is a cordierite low expansion ceramic.

4. The article of claim 3 wherein the ceramic body has an oxide composition comprising,

|  |  |
|---|---|
| $SiO_2$ | 33–46 wt. % |
| $Al_2O_3$ | 37–57 |
| MgO | 5.5–15 |
| ZnO | .4–1.7 |
| $Na_2O + K_2O$ | 1.0–3.0 |
| $ZrO_2$ | 0–5 | the foregoing oxides totaling at least 97% of said body, said body containing essentially no $Li_2O$.

5. The article of claim 4 wherein the composition of said ceramic comprises,

|  |  |
|---|---|
| $SiO_2$ | 39–40 wt. % |
| $Al_2O_3$ | 45–46 |
| MgO | 11–12 |
| ZnO | .7–1.0 |
| $Na_2O$ | 1.0–1.4 |
| $K_2O$ | .4–.6 |
| CaO | .2–.4 |
| $Fe_2O_3$ | 0–.5 |
| $TiO_2$ | 0–.5 |

6. The article of claim 1 wherein said glaze is transparent.

7. The article of claim 1 wherein the crystalline content of the glaze is most dense adjacent the interface between the glaze and the body, and the outer surface of the glaze is substantially non-crystalline.

8. The article of claim 1 wherein the listed components total 96–99% of the oxide composition of said glaze.

9. A glaze having an oxide composition consisting essentially of

|  |  |
|---|---|
| $SiO_2$ | 66–75 wt. % |
| $Al_2O_3$ | 13–22 |
| MgO | 3–8 |
| $B_2O_3$ | 2.5–7 |
| $Na_2O + K_2O$ | .4–2.0 | the above-listed components totaling at least 95% of the composition, and $Li_2O$ is not more than 0.5%, the total of $Fe_2O_3$ and $TiO_2$ is not more than 1.5%, and at least one of ZnO and $ZrO_2$ is included in an amount less than 2%, the ratio $(SiO_2+Al_2O_3+MgO)/(CaO+SrO+BaO+Cs_2O+F_2)$ exceeding at least about 28:1, said glaze when fired on a ceramic body containing cordierite crystals as the major crystal phase therein and the exterior of the glaze is richer in $SiO_2$ than the interior of the glaze.

10. The method of glazing a ceramic body comprising, preparing a glaze having an oxide composition consisting essentially of

|  |  |
|---|---|
| $SiO_2$ | 66–75 wt. % |
| $Al_2O_3$ | 13–22 |
| MgO | 3–8 |
| $B_2O_3$ | 2.5–7 |
| $Na_2O + K_2O$ | .4–2.0 | the above-listed components totaling at least 95% of the composition, and $Li_2O$ is not more than 0.5%, the total of $Fe_2O_3$ and $TiO_2$ is not more than 1.5%, and at least one of ZnO and $ZrO_2$ is included in an amount less than 2% the ratio $(SiO_2+Al_2O_3+MgO)/(CaO+SrO_2+BaO+Cs_2O+F_2)$ exceeding about 28:1, applying the glaze to ceramic body, and firing the glaze on the body, the glaze developing cordierite as the major crystalline phase therein during said firing and the exterior of the glaze is richer in $SiO_2$ than the interior of the glaze.

11. The method of claim 10 wherein said glaze has the composition,

|  |  |
|---|---|
| $SiO_2$ | 71.0 wt. % |
| $Al_2O_3$ | 15.3 |
| MgO | 6.8 |
| $B_2O_3$ | 3.7 |
| $Na_2O$ | .8 |
| $K_2O$ | .2 |
| ZnO | 1.1 |
| $ZrO_2$ | .3 | the balance being CaO, $Fe_2O_3$ and $TiO_2$.

12. The method of claim 10 wherein said body is a cordierite ceramic.

13. The method of claim 12 wherein the ceramic body has the oxide composition,

|  |  |
|---|---|
| $SiO_2$ | 33–46 wt. % |
| $Al_2O_3$ | 37–57 |
| MgO | 5.5–15 |
| ZnO | .4–1.7 |
| $Na_2O + K_2O$ | 1.0–3.0 |
| $ZrO_2$ | 0–5 | the foregoing oxides totaling at least 97% of said body, said body containing essentially no $Li_2O$.

14. The method of claim 3 wherein the cordierite ceramic body has the composition,

|  |  |
|---|---|
| $SiO_2$ | 39–40 wt. % |
| $Al_2O_3$ | 45–46 |
| MgO | 11–12 |
| ZnO | .7–1.0 |
| $Na_2O$ | 1.0–1.4 |

-continued

| | |
|---|---|
| K$_2$O | .4–.6 |
| CaO | .2–.4 |
| Fe$_2$O$_3$ | 0–.5 |
| TiO$_2$ | 0–.5 |

15. The method of claim 10 wherein the glaze is prepared by steps comprising
melting a glass batch and quenching it to form a frit, and
mixing the frit with an inorganic suspending agent, the mixture of frit and suspending agent having the oxide composition set forth.

16. The method of claim 15 wherein the suspending agent is selected from the group consisting of kaolin and bentonite.

17. The method of claim 16 including the further step of mixing the frit with a modifying agent selected from the group consisting of alumina and flint,
the mixture of frit, suspending agent and modifying agent having the oxide composition set forth.

18. The method of claim 10 wherein the body has been bisque fired prior to the application of the glaze thereto, the firing of the glaze thereon comprising a second firing.

19. The article of claim 1, wherein the glaze also includes a colorant.

* * * * *